K. TORNBERG.
CAST ELECTRODE.
APPLICATION FILED DEC. 28, 1910.

998,865.

Patented July 25, 1911.

Witnesses:
George W. Tilden
J. Ellis Glen

Inventor:
Knut Tornberg,
by Albert G. Davis
His Attorney.

UNITED STATES PATENT OFFICE.

KNUT TORNBERG, OF LYNN, MASSACHUSETTS, ASSIGNOR TO GENERAL ELECTRIC COMPANY, A CORPORATION OF NEW YORK.

CAST ELECTRODE.

998,865.  Specification of Letters Patent.  Patented July 25, 1911.

Application filed December 28, 1910. Serial No. 599,715.

*To all whom it may concern:*

Be it known that I, KNUT TORNBERG, a citizen of the United States, residing at Lynn, county of Essex, State of Massachusetts, have invented certain new and useful Improvements in Cast Electrodes, of which the following is a specification.

My invention relates to electrodes and particularly to a means of strengthening an electrode that is formed by casting.

It has heretofore been proposed to make an electrode by first fusing the electrode materials and then casting the same into a metal tube to which the material may adhere. It has also been proposed to fuse the materials and then cast the electrode stick therefrom without any inclosing sheath whatever. A plain cast electrode when without any inclosing tube is liable to be brittle and easily broken, and, when the arc maintaining material is cast into a plain tube, such material is not in all cases sufficiently anchored to the tube.

I have overcome these defects by providing a perforated tube for the electrode. Such a tube may be entirely embedded in the electrode material, or the tube may be an inclosing sheath for the cast material, in which case it is usually preferable to also employ a second tube. In either case the cast electrode material flows into the perforations and securely anchors the electrode material to the tube. An electrode made of magnetite 70 parts, rutile 30 parts and chromite 15 parts may be fused and cast as heretofore described. It is to be understood, however, that any material or mixture of materials suitable for an electrode and capable of being fused and cast may be used.

For a fuller understanding of my invention reference is had to the accompanying drawings, in which—

Figure 1:
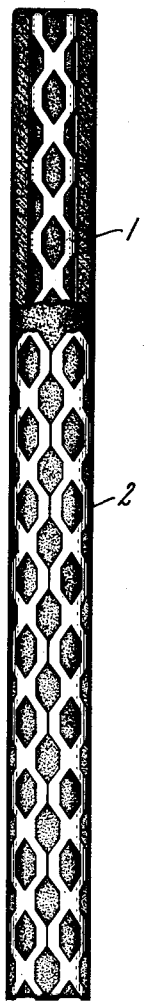
Figure 2:
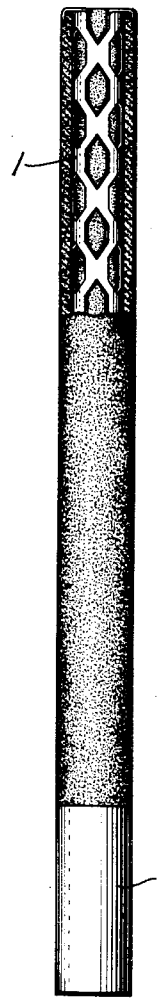

Figure 1 is a side elevation of my electrode, with the upper portion in section; Fig. 2 is a modified form of my electrode, and Fig. 3 is a detail view of the lower portion of the electrode shown in Fig. 1.

Figure 3:
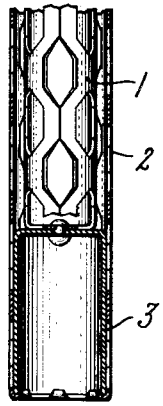

Referring first to Figs. 1 and 3, 1 represents a perforated shell, the axis of which is made to practically coincide with the axis of the mold into which the electrode is to be cast by securing the lower end of the shell to a thimble 3 which in the structure shown in Fig. 1 is placed within a second shell 2 which fits snugly within the mold within which the electrode material is to be cast. Each shell is provided with a plurality of openings which are preferably hexagonal in form so arranged that every cross-section of either shell will contain the same amount of iron, and the shell will be equally conductive throughout. The shell 2 is similar to the shell 1, but is of greater diameter, and when the two shells are placed in position in the mold the fused electrode material is poured into the mold and fills the openings in both of the shells. It is obvious that the outer shell, as well as the inner one, is thus firmly anchored to the electrode material itself. The shells may be conveniently formed from sheets of metal and the two edges simply brought together without welding, thus doing away with an operation that has usually hitherto been considered necessary.

In the modification shown in Fig. 2, the outer shell is dispensed with. In making this electrode, the axis of the shell is made to coincide with the axis of the mold by making the thimble 3 fit snugly within the lower end of the mold.

I have found that I can use an electrode made in accordance with my invention without any liability of being broken. Furthermore, such shells render an electrode which is principally made of magnetite, or other poor conducting material, sufficiently conductive throughout.

What I claim as new, and desire to secure by Letters Patent of the United States, is:—

1. As an article of manufacture, a cast electrode provided with one or more shells having perforations anchoring the electrode material to the shell or shells.

2. As an article of manufacture, a cast electrode provided with one or more shells having a plurality of hexagonal openings for anchoring the electrode material to the shell or shells.

In witness whereof, I have hereunto set my hand this twenty-fourth day of December, 1910.

KNUT TORNBERG.

Witnesses:
JOHN A. MCMANUS, Jr.,
CHARLES A. BARNARD.